Jan. 10, 1939. W. B. MORRIS 2,143,608
FRAME
Filed Jan. 4, 1938 2 Sheets-Sheet 1
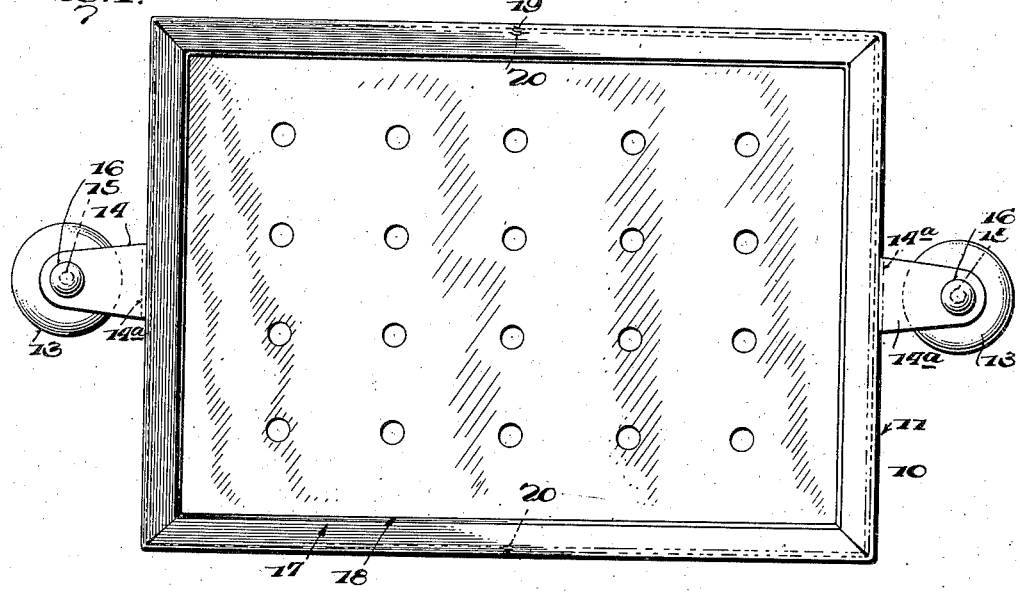
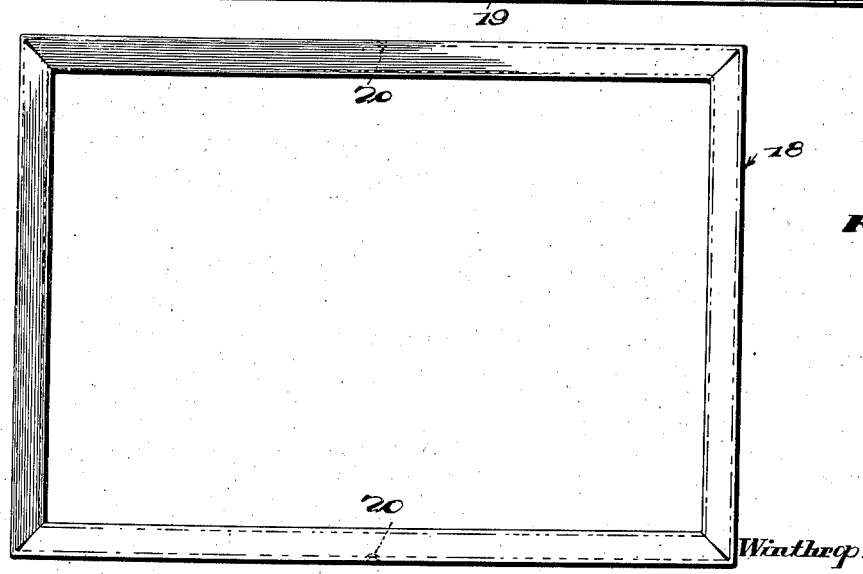
Inventor
Winthrop B. Morris.
By Philip Digger.
Attorney Jan. 10, 1939.   W. B. MORRIS   2,143,608
FRAME
Filed Jan. 4, 1938   2 Sheets-Sheet 2
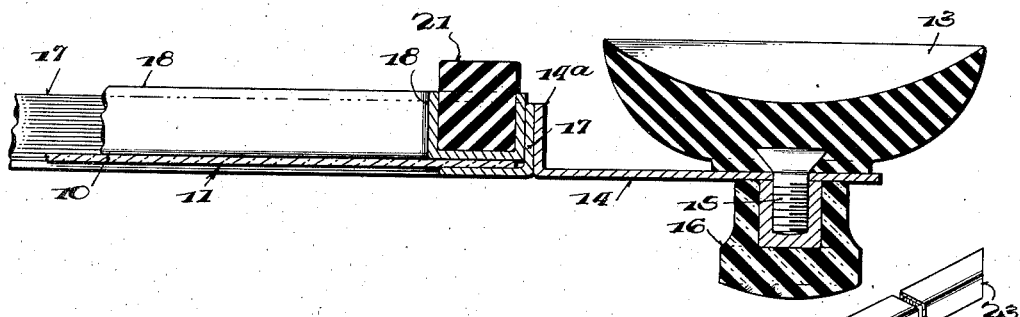
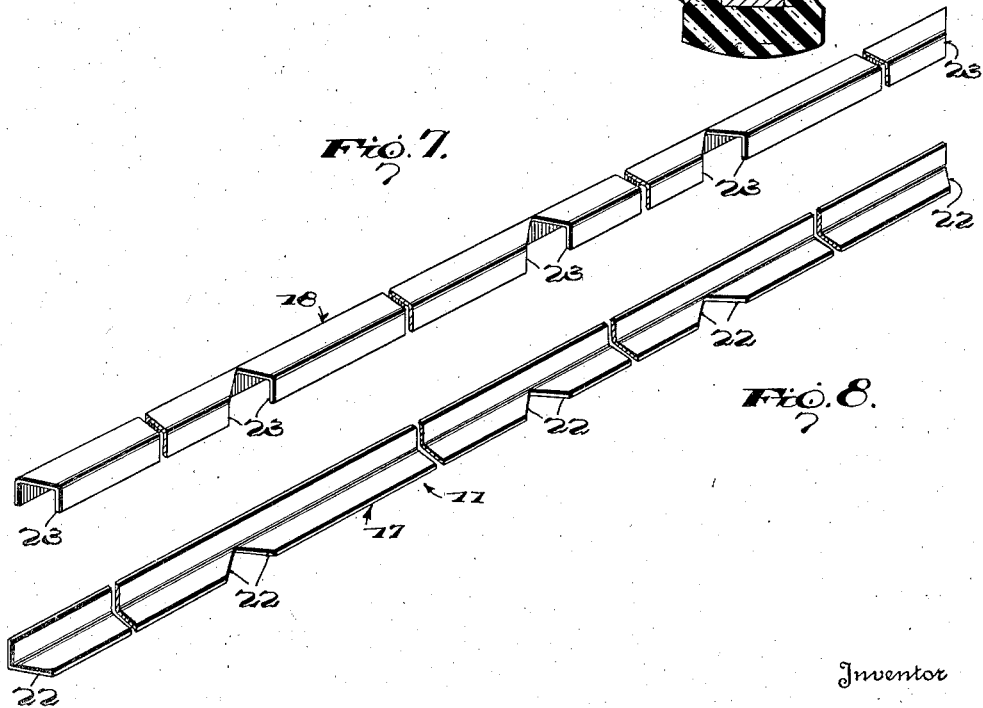
Inventor
Winthrop B. Morris.
By Philip E. Digger.   Attorney Patented Jan. 10, 1939

2,143,608

UNITED STATES PATENT OFFICE 2,143,608

FRAME

Winthrop B. Morris, Matawan, N. J.

Application January 4, 1938, Serial No. 183,280

2 Claims. (Cl. 20—40.5)

This invention relates to frames, and among other objects, aims to provide an inexpensive, easily manufactured frame which is useful for holding transparent panels close to glass windshields and the like to obviate frosting of the latter. The invention has other objects and uses which will be apparent from the following description of a preferred embodiment, which is shown in the accompanying drawings forming a part of this specification.

In said drawings,—

Fig. 1 is a front elevation of a windshield attachment having a frame made in accordance with the invention;

Fig. 2 is a top plan view of the same;

Fig. 3 is a top plan view of the outer frame member;

Fig. 4 is a front elevation of the inner frame member;

Fig. 5 is a top plan view of the inner frame member;

Fig. 6 is an enlarged sectional view, with parts broken away, of the frame, omitting one of the vacuum cups;

Figs. 7 and 8 are fragmentary perspective views showing respectively the outer and inner frame members before being bent to final shape.

Referring particularly to the drawings, there is shown a windshield protector comprising three principal parts, namely, a transparent panel 10 preferably of Celluloid, which may, however, be of glass, isinglass or other transparent materials, a frame 11 for holding the panel, and means attached to the frame for temporarily fixing the panel on a glass windshield or the like. The panel 10 should have a number of perforations 12, as experience has shown that vision through the attachment during frosty weather is greatly improved if perforations are employed. The means for fixing the frame may take several forms, but as herein shown, a pair of rubber vacuum cups 13 are secured to the outer ends of brackets 14 by screws 15 and threaded caps 16. The brackets 14 may be brazed or soldered by their flanges 14a to the outside of the frame 11. Except for the frame, none of the elements so far described forms any part of the present invention.

The improved frame 11 comprises two principal parts, an outer frame member 17, preferably L-shaped in cross-section, and an inner frame member 18 preferably U-shaped in cross-section, the inner frame member preferably being enclosed by the outer frame member as best shown in Fig. 6 and the two frame members closely fitting, so that they may be removably secured together. Each frame member is a closed loop. While a number of mechanical expedients may be resorted to to lock the inner and outer frame members together, I prefer to employ the simplest means possible, namely, a pair of dents or protuberances 19 extending inwardly on opposite sides of the outer frame member 17 and adapted to enter registering perforations or depressions 20 in the inner frame member 18. Thus the frame members may be manually assembled and disassembled. However, it is within the scope of the invention to secure the frame members permanently together. Both frame members are of sheet metal to facilitate forming these registering dents and depressions, and to make possible a frame of light weight such as will be securely held to a glass surface by vacuum cups.

As clearly shown in Fig. 6, the outer L-shaped frame member has one flange snugly fitting around the outside wall of the inner, channel shaped frame member, while the other flange fits over the edge of the transparent panel 10, which lies between the two frame members. This arrangement is eminently satisfactory if the panel is of Celluloid or other non-brittle material; but if the panel is of glass, rubber strips (not shown) should protect the edges of the panel which are gripped between the frame members, and the outer flange of the outer frame member will then be of greater dimensions to accommodate such rubber strips as will be understood without illustration. Obviously the means 19, 20 for frictionally locking the frame members together also hold the panel between the frame members. The channel of the inner frame member receives a sponge rubber or cellulosic sponge insert 21 which is cemented in place and which projects some distance beyond the edges of the channel to provide a sealing member bordering the frame and engaging the glass surface on which the device is mounted.

To afford greater strength to thin gauge material, the outer frame member is an angle, as described above; and as will be understood from Figs. 1 and 7, a single angle member is cut to a length equal to the perimeter of the outer frame, with V-shaped notches 22 intermediate its ends, which are beveled, so that the angle may be bent at three points to make the closed rectangular frame of Fig. 1. The meeting edges of notches 22 are soldered or brazed to make the frame appear to be of continuous, unbroken metal. The same procedure is followed in forming the inner frame 18, which is cut with notches 23 (Fig. 8). As shown in Fig. 4, these notches are not apparent because after the soldering or brazing, a finish of nickel or chromium plate, brightly polished, completely hides the soldered joints on both frame members, and enhances the appearance of the frame, besides rendering it weatherproof.

It will be clear that the frame per se has many uses, too numerous to describe. Moreover, the frame may have various shapes and may be made out of a number of materials besides metal. The invention is obviously not limited to the form described and shown.

Having described a preferred embodiment of the invention, and a preferred adaptation thereof, what I claim as new and desire to secure by Letters Patent is:

1. A frame comprising, in combination, an outer frame member and an inner frame member snugly fitting each other; the outer frame member comprising a sheet metal angle bent to shape, with one flange parallel to the general plane of the frame and the other flange at right angles to said general plane; the inner frame member comprising a sheet metal channel bent to shape, with the web thereof parallel to and spaced from that flange of the outer frame which is parallel to the general plane of the frame, when the frame members are assembled properly; one of the flanges of the channel being in direct contact with said other flange of the angle; both flanges of the channel extending away from the flange of the outer frame which is parallel to the general plane of the frame; and means to unite the frame members.

2. A frame comprising two principal parts, namely, an outer closed loop frame member which throughout its length is L-shaped in cross section, and an inner closed loop frame member which throughout its length is U-shaped in cross section, thereby providing a channel; the outer frame member having one flange outside the perimeter or periphery of the inner frame member, and having its other flange outside the bottom of the U of the inner frame member, whose channel accordingly faces inwardly; said other flange and the bottom of the U being spaced apart to receive and grip between them some object which is to be held by the frame.

WINTHROP B. MORRIS.